(12) United States Patent
Horng et al.

(10) Patent No.: US 8,306,484 B1
(45) Date of Patent: Nov. 6, 2012

(54) DIRECT-CONVERSION TRANSMITTER WITH RESISTANCE TO LOCAL OSCILLATOR PULLING EFFECTS

(75) Inventors: Tzyy-Sheng Horng, Kaohsiung (TW); Chieh-Hsun Hsiao, Kaohsiung (TW); Kang-Chun Peng, Kaohsiung (TW)

(73) Assignee: National Sun Yat-Sen University, Gushan District, Kaohsiung (TW)

( * ) Notice: Subject to any disclaimer, the term of this patent is extended or adjusted under 35 U.S.C. 154(b) by 56 days.

(21) Appl. No.: 13/118,510

(22) Filed: May 30, 2011

(51) Int. Cl.
*H04B 1/66* (2006.01)
(52) U.S. Cl. ........ 455/102; 455/255; 455/262; 455/264; 455/318; 455/127.1
(58) Field of Classification Search .............. 455/102, 455/255, 262, 264, 318, 127.1
See application file for complete search history.

(56) References Cited

U.S. PATENT DOCUMENTS

| | | | |
|---|---|---|---|
| 8,058,941 B2 * | 11/2011 | Kurogo et al. | 331/158 |
| 8,169,358 B1 * | 5/2012 | Bourdelais et al. | 342/52 |
| 2003/0071696 A1 * | 4/2003 | Kubo et al. | 331/176 |
| 2011/0158081 A1 * | 6/2011 | Wang et al. | 370/201 |

OTHER PUBLICATIONS

Hsiao et al., Analysis and Improvement of Direct-Conversion Transmitter Pulling Effects in Constant Envelope Modulation Systems, IEEE Transactions on Microwave Theory and Techniques, vol. 58, No. 12, Dec. 2010, 4137-4146.

* cited by examiner

*Primary Examiner* — Sanh Phu
(74) *Attorney, Agent, or Firm* — Jackson IPG PLLC (57) ABSTRACT

A direct-conversion transmitter with resistance to local oscillator pulling effect comprises a local oscillation circuit, a quadrature modulator connected with the local oscillation circuit, a power amplifier connected with the quadrature modulator, a first variable analog delay device connected with the power amplifier, a variable analog attenuator connected with the first variable analog delay device, an inner self-injection loop, and a power combiner connected with the variable analog attenuator and the inner self-injection loop. The local oscillation circuit comprises a two point voltage-controlled oscillator and a phase locked loop connected with the two point voltage-controlled oscillator. The inner self-injection loop comprises a second variable analog delay device, a phase shifter connected with the second variable analog delay device and a variable gain amplifier connected with the phase shifter. Signal distortion due to pulling effect in direct-conversion transmitter can be effectively suppressed by circuit design over the inner self-injection loop.

6 Claims, 9 Drawing Sheets

| Measurement Bandwidth | 30 kHz | | | | | |
|---|---|---|---|---|---|---|
| Channel Bandwidth | 1.25 MHz | | | | | |
| Frequency Offset | 885 kHz | | | 1.25 MHz | | |
| cdma 2000 1× Specification | −45 dB | | | −45 dB | | |
| ACPR w.r.t Pulled Spectrum ($P_{inj} = -45$ dbm) | Sim. | Mea. | | Sim. | Mea. | |
| | −28.09 dB | −26.73 dB | | −34.41 dB | −33.55 dB | |
| ACPR w.r.t Improved Pulled Spectrum | −54.12 dB | −52.51 dB | | −60.63 dB | −60.74 dB | |

FIG. 9
PRIOR ART though the radio-frequency mixer 230, mixes with distorted
DIRECT-CONVERSION TRANSMITTER WITH RESISTANCE TO LOCAL OSCILLATOR PULLING EFFECTS

FIELD OF THE INVENTION

The present invention is generally relating to a direct-conversion transmitter, more particularly to a direct-conversion transmitter with resistance to local oscillator pulling effects.

BACKGROUND OF THE INVENTION

In the field of wireless communication system, one of the most common interferences is occurred from a transmitter output modulation signal amplified by a power amplifier, then, an electromagnetic radiation or a substrate coupling phenomenon may interfere in the local oscillation signal to lead a deterioration of spectral purity and phase noise therefore severely effecting the output quality of the communication system.

Figure 9:
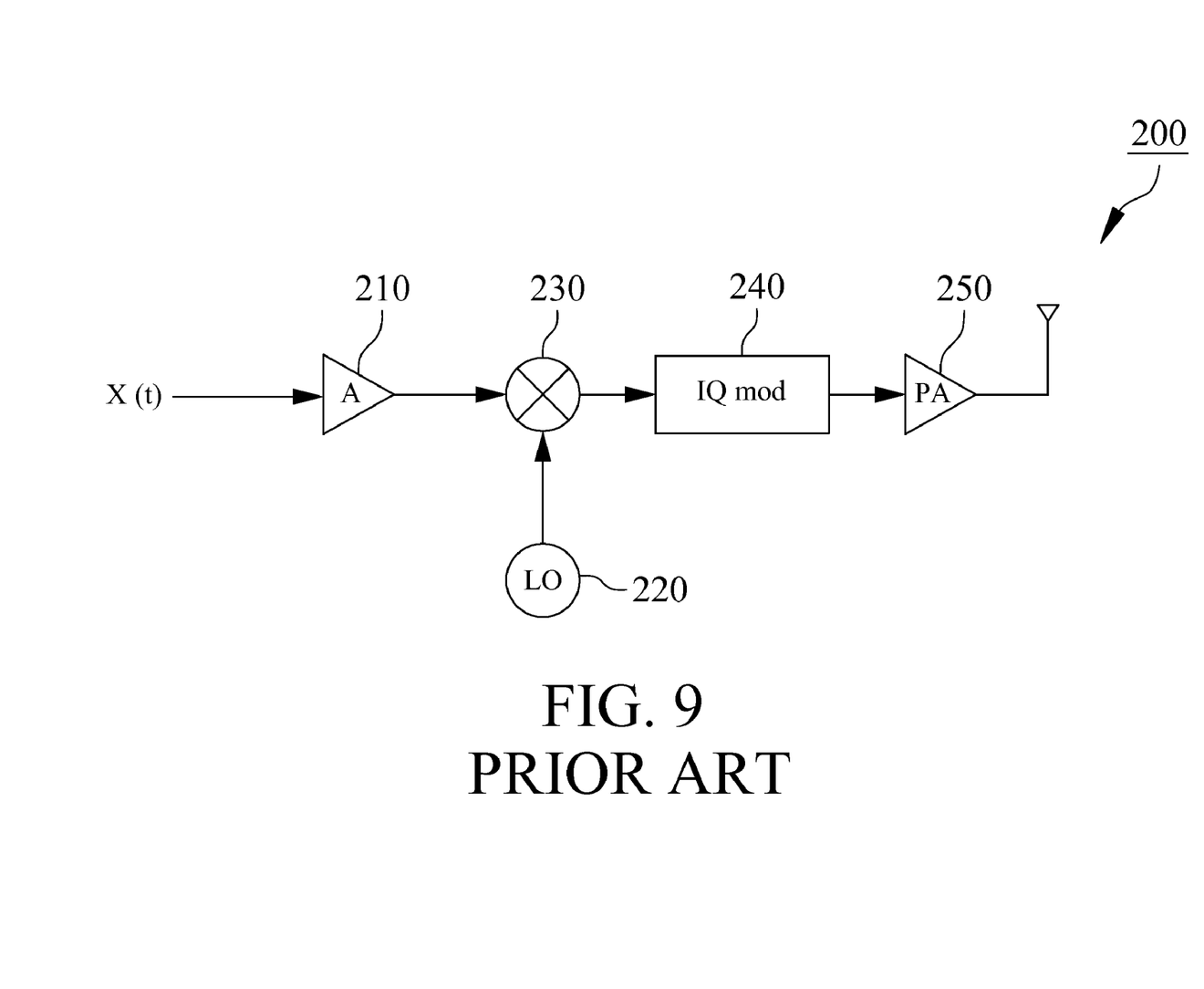
FIG. 9 is a schematic diagram of a conventional direct-conversion transmitter.

Referring to FIG. 9, a conventional direct-conversion transmitter 200 comprises a signal amplifier 210, a local oscillation circuit 220, a radio-frequency mixer 230 electrically connected with the signal amplifier 210 and the local oscillation circuit 220, a quadrature modulator 240 electrically connected with the radio-frequency mixer 230 and a power amplifier 250 electrically connected with the quadrature modulator 240. The direct-conversion transmitter 200 generates the required modulation RF transmit signal. However, owing to the nature of oscillators, local oscillation circuit 220 is subject to the external interference, which often causes frequency pulling effects to contaminate the spectral purity, and thus transmit signal quality. Additionally, there always exists signal distortion due to non-ideal physical characteristics of conversion circuit. For the reason that the modulation signal of the direct-conversion transmitter passes through the radio-frequency mixer 230, mixes with distorted local oscillation signal and amplifies via the power amplifier 250, a critical deterioration of the communication quality for the direct conversion transmitter 200 is occurred. Therefore, designer should improve the anti-interference capability of local oscillator and the linearity to achieve the predetermined signal quality specification of general wireless communication system.

SUMMARY

The primary object of the present invention is to provide a direct-conversion transmitter with resistance to local oscillator pulling effects comprising a local oscillation circuit, a quadrature modulator, a power amplifier, a first variable analog delay device, a variable analog attenuator, an inner self-injection loop and a power combiner, wherein the local oscillation circuit comprises a two point voltage-controlled oscillator and a phase locked loop electrically connected with the two point voltage-controlled oscillator. The two point voltage-controlled oscillator comprises an injection port, a matching circuit electrically connected with the injection port, a voltage modulation port, an LC resonator electrically connected with the matching circuit and the voltage modulation port, a Colpitts capacitor unit electrically connected with the LC resonator, and an active circuit electrically connected with the LC resonator and the Colpitts capacitor unit. The quadrature modulator is electrically connected with the local oscillation circuit, the power amplifier is electrically connected with the quadrature modulator, the first variable analog delay device is electrically connected with the power amplifier, and the variable analog attenuator is electrically connected with the first variable analog delay device. The inner self-injection loop comprises a second variable analog delay device, a first phase shifter electrically connected with the second variable analog delay device, and a first variable gain amplifier electrically connected with the first phase shifter. The power combiner is electrically connected with the variable analog attenuator and the inner self-injection loop. In this invention, a local oscillator pulling effect might influence the spectral purity and the phase noise of a local oscillation signal, by means of providing new circuit design of the inner self-injection loop, the injection pulling effect can be suppressed to effectively mitigate PM-FM conversion distortion.

DETAILED DESCRIPTION OF THE INVENTION

Figure 1:
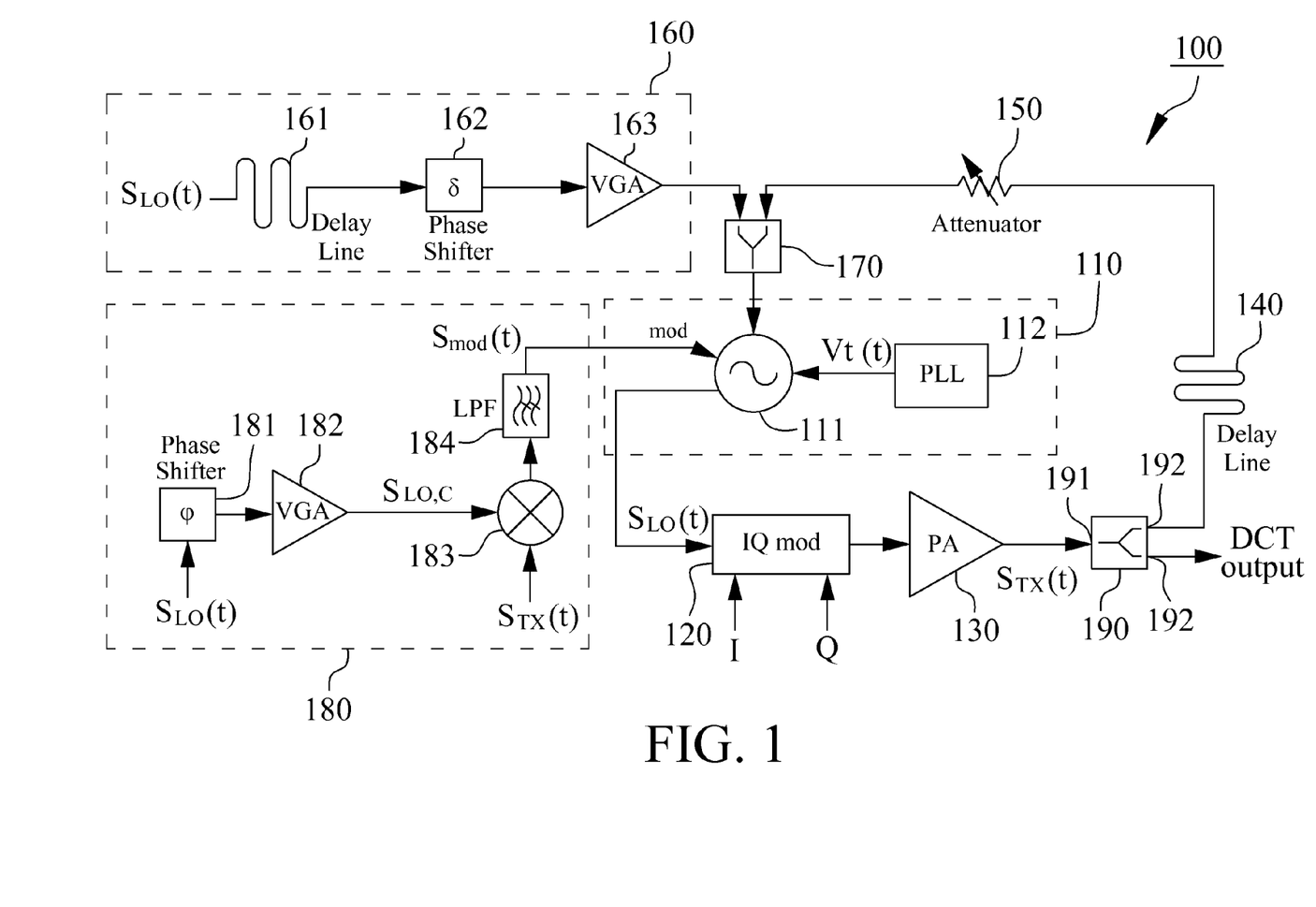
FIG. 1 is a circuit diagram illustrating a direct-conversion transmitter with resistance to local oscillator pulling effects in accordance with an embodiment of the present invention.
Figure 2:
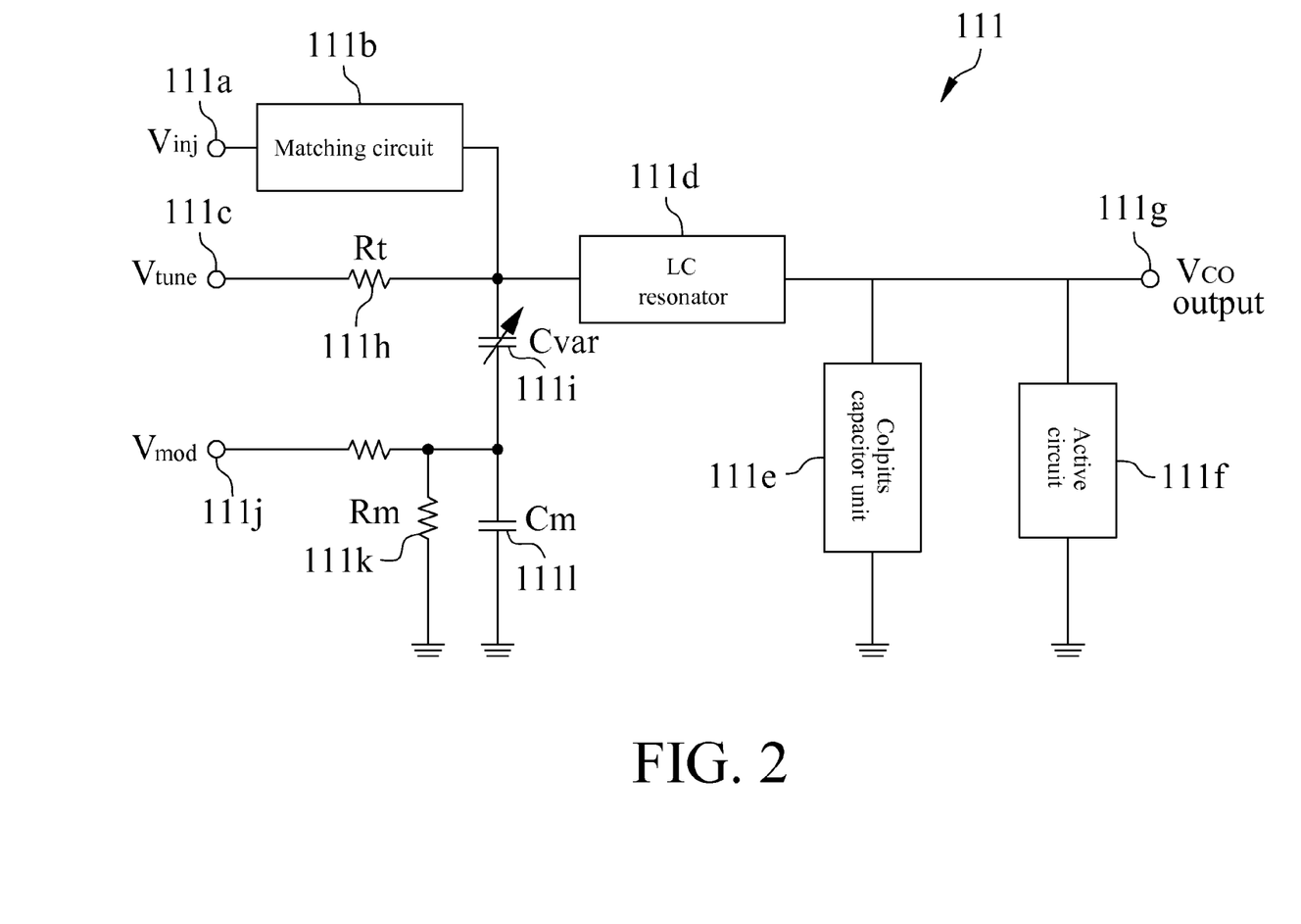
FIG. 2 is a schematic diagram illustrating a two point voltage-controlled oscillator of the direct-conversion transmitter with resistance to local oscillator pulling effects in accordance with an embodiment of the present invention.

With reference to FIGS. 1 and 2, a direct-conversion transmitter with resistance to local oscillator pulling effects 100 in accordance with a preferable embodiment of the present invention comprises a local oscillation circuit 110, a quadrature modulator 120, a power amplifier 130, a first variable analog delay device 140, a variable analog attenuator 150, an inner self-injection loop 160 and a power combiner 170. The local oscillation circuit 110 has a two point voltage-controlled oscillator 111 and a phase locked loop 112 electrically connected with the two point voltage-controlled oscillator 111, wherein the two point voltage-controlled oscillator 111 comprises an injection port 111a, a matching circuit 111b electrically connected with the injection port 111a, a voltage modulation port 111c, an LC resonator 111d electrically connected with the matching circuit 111b and the voltage modulation port 111c, a Colpitts capacitor unit 111e electrically connected with the LC resonator 111d, an active circuit 111f electrically connected with the LC resonator 111d and the Colpitts capacitor unit 111e, and a voltage-controlled output terminal 111g electrically connected with the LC resonator 111d, the Colpitts capacitor unit 111e and the active circuit 111f. The voltage-controlled output terminal 111g of the two point voltage-controlled oscillator 111 enables to output a local oscillation signal. The quadrature modulator 120 is electrically connected with the two point voltage-controlled oscillator 111 of the local oscillation circuit 110 and applied for receiving the local oscillation signal to generate a modulation transmit RF signal. The power amplifier 130 is electrically connected with the quadrature modulator 120 and applied for receiving the baseband modulation signal to generate a transmission signal. The first variable analog delay device 140 is electrically connected with the power amplifier 130 and applied for receiving the transmission signal to generate a delay signal. The variable analog attenuator 150 is electrically connected with the first variable analog delay device 140 and applied for receiving the delay signal to generate a first modulation signal, which serves as a relative self-dependent modulation interference. The inner self-injection loop 160 comprises a second variable analog delay device 161, a first phase shifter 162 electrically connected with the second variable analog delay device 161 and a first variable gain amplifier 163 electrically connected with the first phase shifter 162, wherein the local oscillation signal is fed to the inner self-injection loop 160 to generate a second modulation signal. The power combiner 170 is electrically connected with the variable analog attenuator 150 and the inner self-injection loop 160 and applied for receiving the first modulation signal and the second modulation signal to generate a mixed signal, wherein the mixed signal is fed to the injection port 111a of the two point voltage-modulated oscillator 111. Besides, a voltage modulation signal generated by the phase locked loop 112 is fed to the voltage modulation port 111c of the two point voltage-controlled oscillator 111. In this embodiment, the phase noise of the local oscillation circuit 110 caused by external output signal can be effectively suppressed via circuit design of the inner self-injection loop 160. Therefore, a PM-FM distortion phenomenon occurred in the direct-conversion transmitter 100 due to local oscillator pulling effects can be significantly improved.

Figure 3:
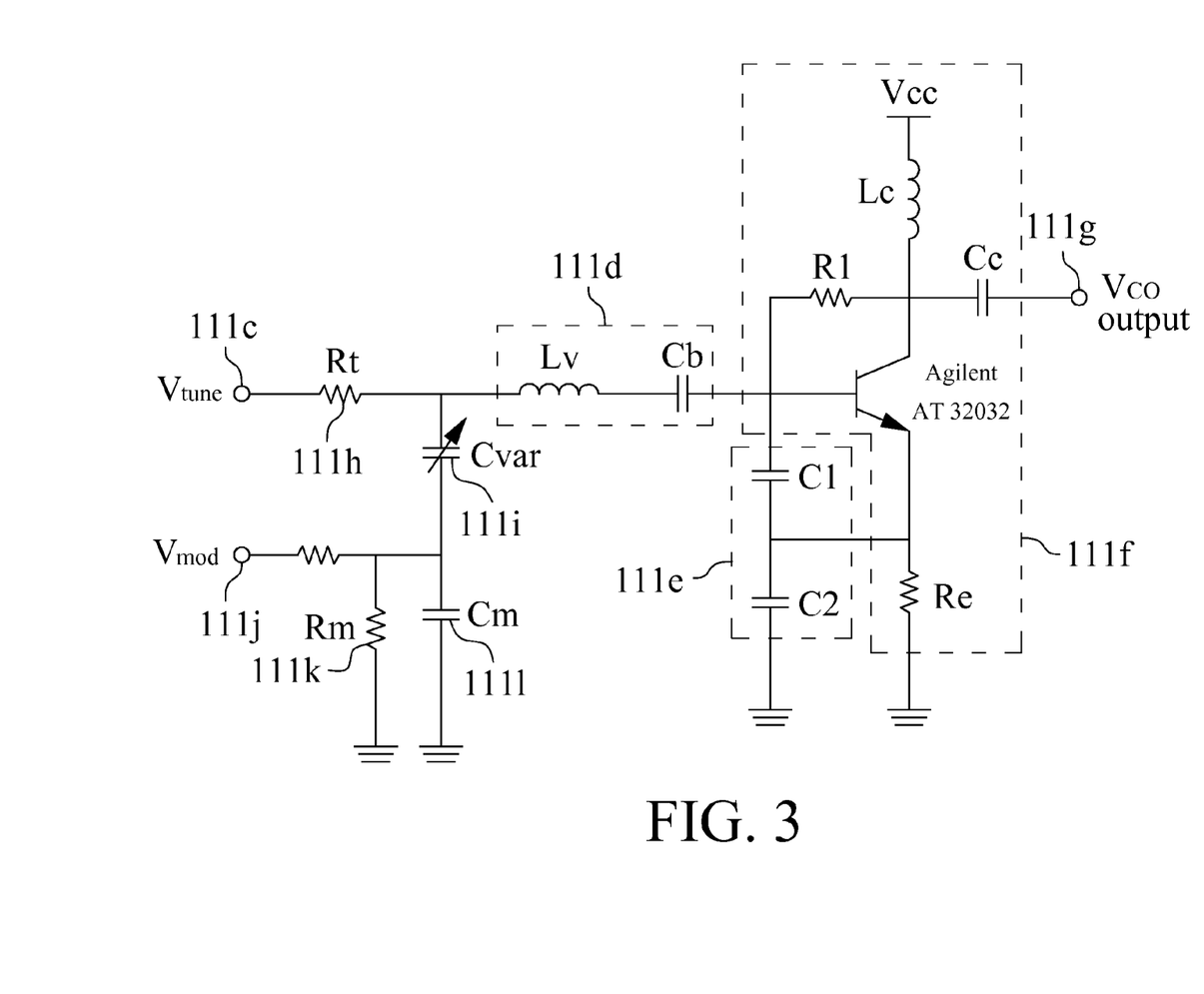
FIG. 3 is a circuit diagram illustrating a two point voltage-controlled oscillator of the direct-conversion transmitter with resistance to local oscillator pulling effects in accordance with an embodiment of the present invention.

With reference to FIGS. 1, 2 and 3, the two point voltage-controlled oscillator 111 further comprises a first bias resistor 111h and a variable capacitor 111i, one port of the first bias resistor 111h is electrically connected with the voltage modulation port 111c, and another port of the first bias resistor 111h is electrically connected with the matching circuit 111b, the LC resonator 111d and the variable capacitor 111i. In addition, the two point voltage-controlled oscillator 111 further comprises a voltage adjusting port 111j, a second bias resistor 111k and a coupling capacitor 111l, wherein the second bias resistor 111k, the coupling capacitor 111l and the variable capacitor 111i are electrically connected with the voltage adjusting port 111j. Furthermore, the direct-conversion transmitter 100 further comprises a power divider 190, mentioned power divider 190 has an input terminal 191 and two output terminals 192, and the input terminal 191 is electrically connected with the power amplifier 130. In this embodiment, the input terminal 191 of the power divider 190 electrically connects with an external output terminal and transmits output signal through an antenna (not shown in Figs.), and another output terminal 192 of the power divider 190 is electrically connected with the first variable analog delay device 140. Due to mentioned relationship of connection, the transmission signal can be interference-modulated signal of the local oscillation circuit 110 as well. Besides, the direct-conversion transmitter 100 further comprises a second port voltage-modulated loop 180 having a second phase shifter 181, a second variable gain amplifier 182 electrically connected with the second phase shifter 181, a radio-frequency mixer 183 electrically connected with the second variable gain amplifier 182, and a low pass filter 184 electrically connected with the radio-frequency mixer 183. In this embodiment, the low pass filter 184 is electrically connected with the voltage adjusting port 111j of the two point voltage-controlled oscillator 111, mentioned second port voltage-modulated loop 180 enables to improve AM-FM and PM-FM distortion while the local oscillation circuit 110 is interfered by non-constant envelope modulation signal.

Figure 4A:
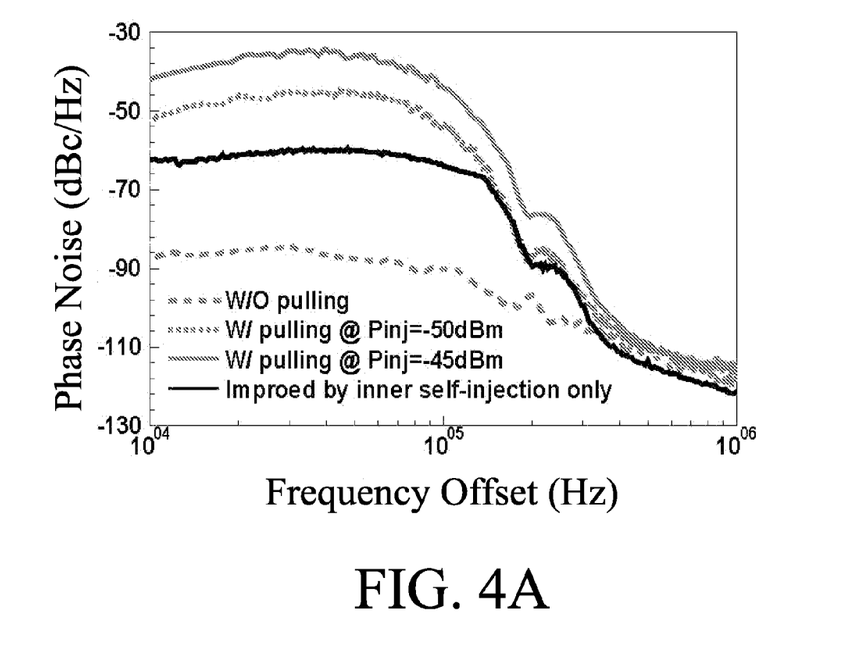
FIG. 4A is local oscillation circuit phase noise measurement chart illustrating a local oscillation circuit of the direct-conversion transmitter with resistance to local oscillator pulling effects in accordance with an embodiment of the present invention.
Figure 4B:
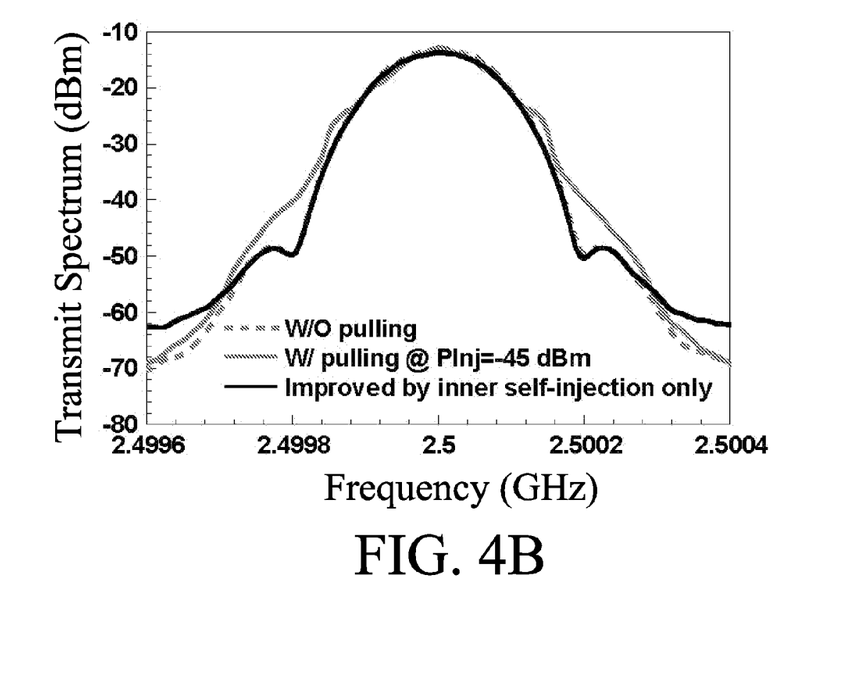
FIG. 4B is a transmit spectrum measurement chart illustrating a local oscillation circuit of the direct-conversion transmitter with resistance to local oscillator pulling effects in accordance with an embodiment of the present invention.
Figure 5:
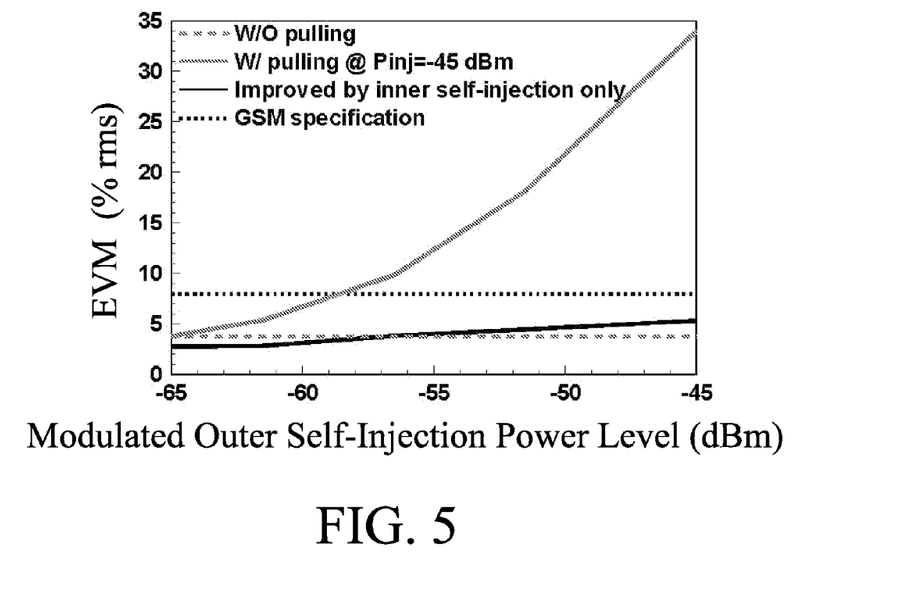
FIG. 5 is error vector magnitudes (EVMs) of transmitter output signal under different interference conditions and improvement strategies illustrating the direct-conversion transmitter with resistance to local oscillator pulling effects in accordance with an embodiment of the present invention.
Figure 6A:
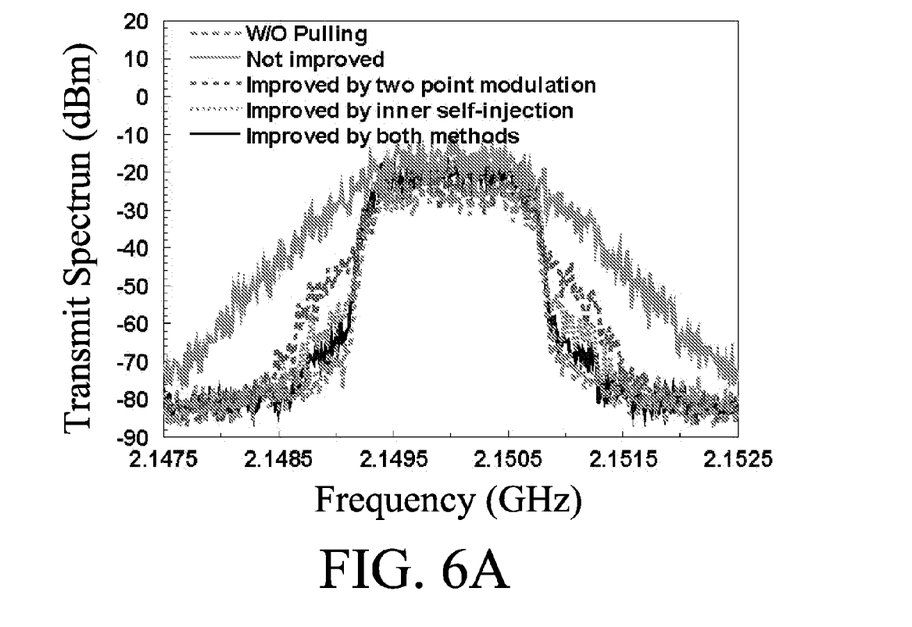
FIG. 6A is a transmit spectrum measuring chart under different interference conditions and improvement strategies illustrating the direct-conversion transmitter with resistance to local oscillator pulling effects in accordance with an embodiment of the present invention.
Figure 6B:
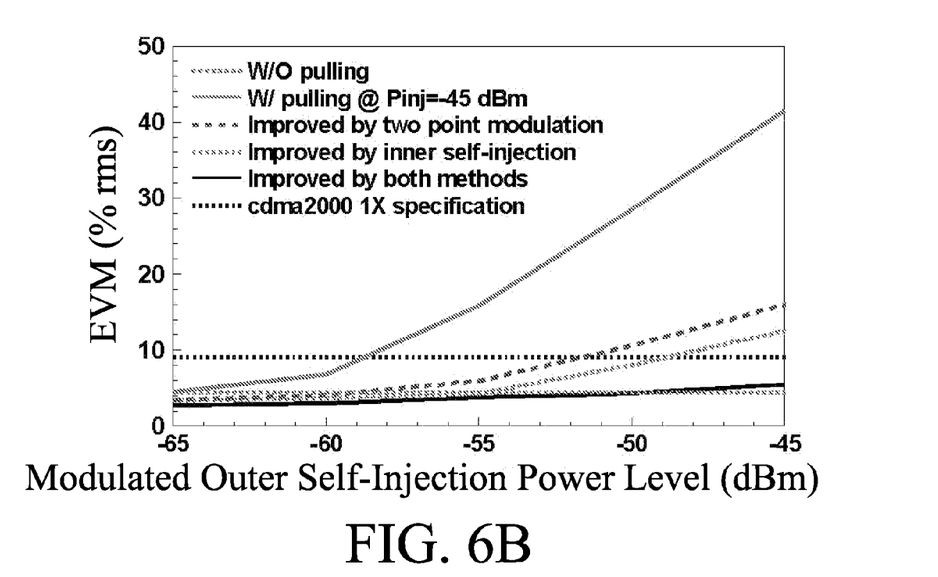
FIG. 6B is an output quality measuring chart under different interference conditions and improvement strategies illustrating the direct-conversion transmitter with resistance to local oscillator pulling effects in accordance with an embodiment of the present invention.
Figure 7:
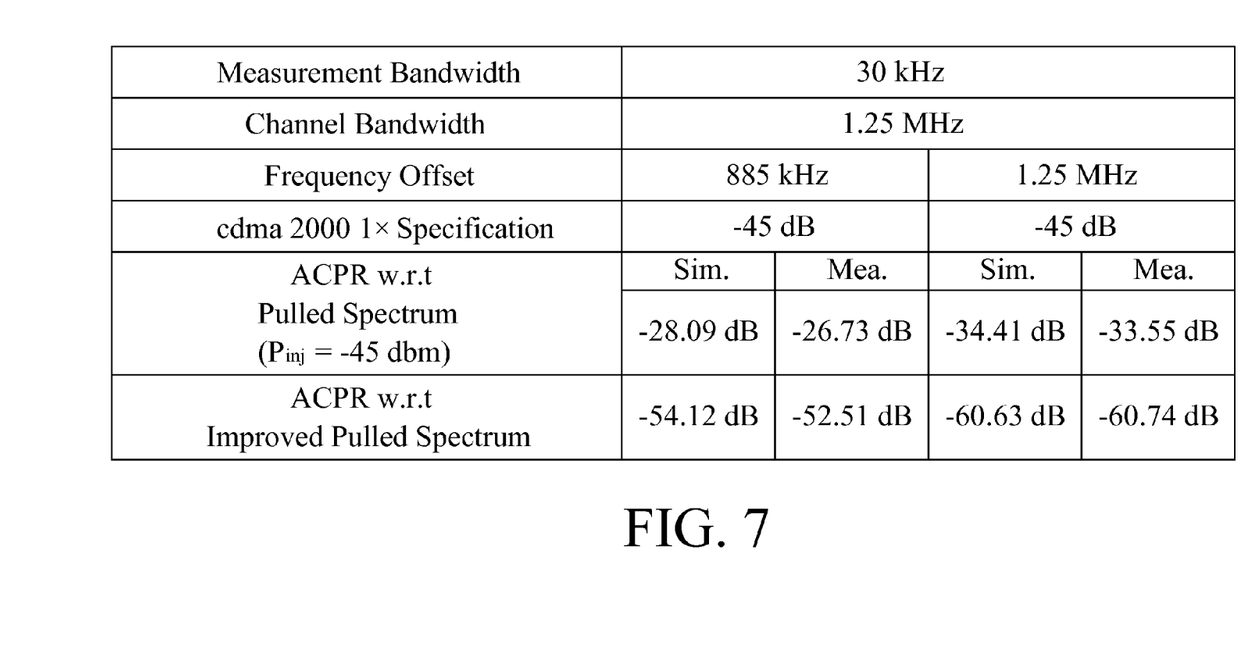
FIG. 7 is a simulation/measurement data comparison chart of adjacent interference power illustrating the direct-conversion transmitter with resistance to local oscillator pulling effects in accordance with an embodiment of the present invention.
Figure 8A:
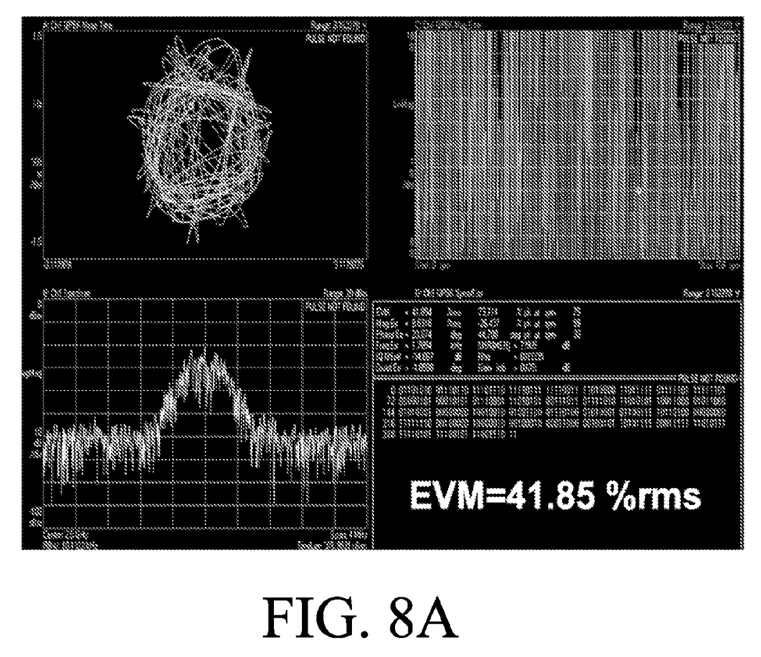
FIGS. 8A-8B is a transmitter output signal demodulation constellation chart applied in QPSK modulation system illustrating the direct-conversion transmitter with resistance to local oscillator pulling effects in accordance with an embodiment of the present invention.
Figure 8B:
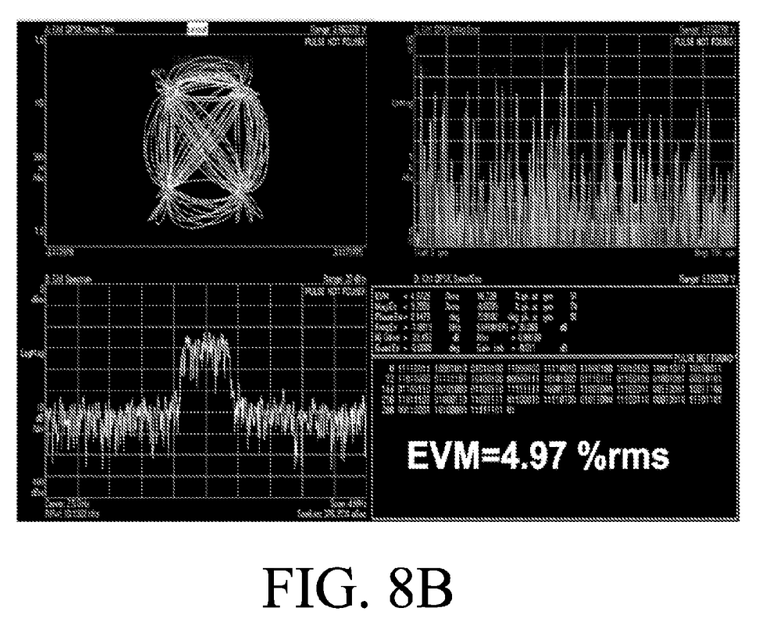

Referring to FIGS. 4A, 4B and 5, the measuring charts before/after improvement through the inner self-injection loop 160 are provided, with reference to FIG. 4A, once the inner self-injection loop 160 is added, the phase noise of the local oscillation circuit 110 can be effectively reduced. With reference to FIG. 4B, the transmit spectrum of the direct-conversion transmitter 100 aggravated by pulling effects improves significantly. With reference to FIG. 5, the transmit signal quality (determined via error vector magnitude) of the direct-conversion transmitter 100 can be substantially increased. Next, with reference to FIGS. 6A to 8B, the characteristics measuring charts of the inner self-injection loop 160 in combination with the second port voltage-modulated loop 180 are provided. Consequently, the spectral purity, the adjacent channel power ratio and the output quality of the direct-conversion transmitter 100 are overall improved and meet the specification of present communication system such as cdma2000 1x (referring to FIG. 7).

In this invention, by applying the circuit design of the inner self-injection loop 160 without a huge hardware design cost or complex digital processing, the signal deterioration due to local oscillator pulling effects can be effectively suppressed therefore forming anti-interference abilities for the local oscillation circuit 110.

While this invention has been particularly illustrated and described in detail with respect to the preferred embodiments thereof, it will be clearly understood by those skilled in the art that is not limited to the specific feature shown and described and various modifications and changes in form and details may be made without departing from the spirit and scope of this invention.

What is claimed is:
1. A direct-conversion transmitter with resistance to local oscillator pulling effects comprises:
    a local oscillation circuit having a two point voltage-controlled oscillator and a phase locked loop electrically connected with the two point voltage-controlled oscillator, wherein the two point voltage-controlled oscillator enables to output a local oscillation signal and comprises an injection port, a matching circuit electrically connected with the injection port, a voltage modulation port, an LC resonator electrically connected with the matching circuit and the voltage modulation port, a Colpitts capacitor unit electrically connected with the LC resonator, and an active circuit electrically connected with the LC resonator and the Colpitts capacitor unit;

a quadrature modulator electrically connected with the local oscillation circuit and applied for receiving the local oscillation signal to generate a modulation transmit RF signal;

a power amplifier electrically connected with the quadrature modulator and applied for receiving the baseband modulation signal to generate a transmission signal;

a first variable analog delay device electrically connected with the power amplifier and applied for receiving the transmission signal to generate a delay signal;

a variable analog attenuator electrically connected with the first variable analog delay device and applied for receiving the delay signal to generate a first modulation signal, which serves as a relative self-dependent modulation interference;

an inner self-injection loop comprising a second variable analog delay device, a first phase shifter electrically connected with the second variable analog delay device and a first variable gain amplifier electrically connected with the first phase shifter, wherein the local oscillation signal is fed to the inner self-injection loop to generate a second modulation signal; and a power combiner electrically connected with the variable analog attenuator and the inner self-injection loop and applied for receiving the first modulation signal and the second modulation signal to generate a mixed signal, wherein the mixed signal is fed to the injection port of the two point voltage-modulated oscillator.

2. The direct-conversion transmitter with resistance to local oscillator pulling effects in accordance with claim 1, wherein the phase locked loop is electrically connected with the voltage modulation port of the two point voltage-controlled oscillator.

3. The direct-conversion transmitter with resistance to local oscillator pulling effects in accordance with claim 1, wherein the two point voltage-controlled oscillator comprises a first bias resistor and a variable capacitor, one port of the first bias resistor is electrically connected with the voltage modulation port, and another port of the first bias resistor is electrically connected with the matching circuit, the LC resonator and the variable capacitor.

4. The direct-conversion transmitter with resistance to local oscillator pulling effects in accordance with claim 3, wherein the two point voltage-controlled oscillator further comprises a voltage adjusting port, a second bias resistor and a coupling capacitor, the voltage adjusting port is electrically connected with the second bias resistor, the coupling capacitor and the variable capacitor.

5. The direct-conversion transmitter with resistance to local oscillator pulling effects in accordance with claim 4 further comprises a two port voltage-modulated loop, wherein the two port voltage-modulated loop has a second phase shifter, a second variable gain amplifier electrically connected with the second phase shifter, a radio-frequency mixer electrically connected with the second variable gain amplifier and a low pass filter electrically connected with the radio-frequency mixer, wherein the low pass filter is electrically connected with the voltage adjusting port of the two point voltage-controlled oscillator.

6. The direct-conversion transmitter with resistance to local oscillator pulling effects in accordance with claim 1 further comprises a power divider, wherein the power divider has an input terminal and at least one output terminal, the input terminal is electrically connected with the power amplifier, and the output terminal is electrically connected with the first variable analog delay device.

* * * * *